United States Patent
Park et al.

(10) Patent No.: US 7,031,583 B2
(45) Date of Patent: Apr. 18, 2006

(54) OPTICAL FIBER UNIT HAVING EXCELLENT ELASTICITY AND OPTICAL CABLE INCLUDING THE SAME

(75) Inventors: Do-Hyun Park, Gyeonggi-do (KR); Gi-Joon Nam, Seoul (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 10/979,585

(22) Filed: Nov. 2, 2004

(65) Prior Publication Data
US 2006/0045453 A1 Mar. 2, 2006

(30) Foreign Application Priority Data
Aug. 25, 2004 (KR) ................ 10-2004-0067257

(51) Int. Cl.
G02B 6/02 (2006.01)
G02B 6/22 (2006.01)
G02B 6/44 (2006.01)
G02B 6/16 (2006.01)

(52) U.S. Cl. .................. 385/128; 385/123; 385/100
(58) Field of Classification Search ............. 385/128, 385/123, 100
See application file for complete search history.

(56) References Cited

U.S. PATENT DOCUMENTS 6,579,914 B1 * 6/2003 Gantt et al. ............ 522/92

* cited by examiner

*Primary Examiner*—Brian Healy
*Assistant Examiner*—Charlie Peng
(74) *Attorney, Agent, or Firm*—Jones Day

(57) ABSTRACT

Disclosed are an optical fiber unit in which at least 1-core optical fiber is mounted in and protected by a buffer tube, and an optical cable including the optical fiber unit. The buffer tube is made of a mixture, which includes a composite resin including a resin selected from polyolefin polymer, nitrile rubber and their mixture, and plasticized polyvinylchloride; and an inorganic additive, wherein, in a stress-strain curve of the buffer tube, a modulus is 5 to 50 kgf/mm$^2$ in a linear region with an elongation less than 1% and a tan δ is less than 0.5 at 30° C. The buffer tube of the optical fiber unit may be very usefully applied to an optical cable because it may be easily cut out to ensure easy contact and gives excellent elasticity without being crushed by lateral pressure.

14 Claims, 1 Drawing Sheet

OPTICAL FIBER UNIT HAVING EXCELLENT ELASTICITY AND OPTICAL CABLE INCLUDING THE SAME

BACKGROUND OF THE INVENTION

1. Field of the Invention

The present invention relates to an optical fiber unit in which at least 1-core optical fiber is mounted in and protected by a buffer tube, and an optical cable including the optical fiber unit.

2. Description of the Related Art

As various communication service such as bi-directional communications and image communications is propagated more broadly at home and abroad, a demand for optical cables keeps increasing. Referring to FIG. 1, a general optical cable 20 has a plurality of optical fiber units 10 in which 1- to 12-core optical fiber 13 is mounted in a buffer tube 15 and a jelly 11 is selectively filled therein. The plurality of optical fiber units 10 are inserted into a secondary sheath 16, and the secondary sheath 16 is filled with waterproof powder or jelly 17 for making it watertight. In addition, the outside of the secondary sheath 16 is selectively wrapped by a waterproof tape or paper 18, and the outermost layer is protected by a primary sheath 19 made of resin. Among them, the buffer tube plays a very important role of directly protecting the optical fiber from external forces, and it is also a most essential factor to determine properties of the optical cable.

The buffer tube is generally made of a crystalline polymer such as high density polyethylene and polypropylene, which is hard and has excellent mechanical characteristics, in consideration of a primary function for protecting an optical fiber. However, since the crystalline polymer has very high crystallinity, a shrinkage of the tube is greatly changed according to a cooling condition after the tube is extruded. If the tube is shrunk, bending of the optical fiber is caused, resulting in attenuation that deteriorates transmission capability and rate of the optical fiber. Thus, it is difficult to establish and control extrusion conditions of tubes to which a polymer resin with high crystallinity is applied. In addition, in case a gap between the optical fiber and the tube is small due to the small outer diameter of the unit tube and the high packing density of the optical fiber inserted into the tube, the aforementioned hard polymer materials are broken due to bad flexibility when a cable or tube is seriously bent. Accordingly, stress is given to the optical fiber to cause attenuation, and the tube does not easily restore its original shape due to low elasticity of the materials. Since the tube is not restored into an original shape, stress caused by pressing of the tube is continuously exerted to the optical fibers inserted into the tube. As mentioned above, the attenuation is increased due to the bending of the optical fiber caused by lateral pressure. In addition, these hard polymer materials are not easily shed and require experienced skill for shedding, so they take much time for contact of optical fibers. That is to say, some strands of optical fibers should be taken out to branch off the cable in a midway position. However, the buffer tube made of hard polymer materials such as high density polyethylene may damage the optical fiber when being shed, and it is also difficult to cut out the tube smoothly. In order to shed the buffer tube, an effective way is to make a scar on a certain region of the buffer tube and then tear it. However, the hard high density polyethylene has not good tear characteristic due to bad initial brittleness and strong tenacity. In addition, since the buffer tube is elongated while being torn, it is not easy to tear it over several ten centimeters smoothly.

In order to solve this problem, PE-EVA (polyethylene-ethylene vinylacetate copolymer) blend, plasticized PVC (polyvinylchloride), PVC-PUR (polyvinylchloride-polyurethane) blend, and polyolefin elastomer are recently used as a material of the buffer tube.

However, the plasticized PVC is apt to be easily deformed due to external force or lateral pressure, and it has low elasticity, so the buffer tube made of the plasticized PVC does not restore its original shape if it is pressed during installation. Thus, the plasticized PVC transfers stress to optical fibers as it is, thereby causing attenuation. In addition, the buffer tube made of PE-EVA blend or PVC-PUR blend has bad elasticity and weak jelly resistance, though it has better reliability than that made of plasticized PVC. Meanwhile, polyolefin elastomer has good elasticity but is too sensitive to external stress during the manufacturing procedure, so the buffer tube made of it may be easily elongated and generates after-shrinkage, thereby causing bending of optical fibers.

SUMMARY OF THE INVENTION

The present invention is designed to solve the problems of the prior art, and therefore it is an object of the present invention to provide an optical fiber unit protected by a buffer tube, which is easily torn to ensure easy contact, is not easily crushed by lateral pressure, and is good in restoring its original shape. An object of the present invention is also to provide an optical cable having the optical fiber unit.

In order to accomplish the above object, the present invention provides an optical fiber unit in which at least 1-core optical fiber is mounted in and protected by a buffer tube, wherein the buffer tube is made of a mixture which includes a composite resin including a resin selected from the group consisting of polyolefin polymer, nitrile rubber, and their mixture, and plasticized polyvinylchloride; and an inorganic additive, wherein, in a stress-strain curve of the buffer tube, a modulus is 5 to 50 kgf/mm$^2$ in a linear region with an elongation less than 1% and a tan δ is less than 0.5 at 30° C.

In the optical fiber unit according to the present invention, the polyolefin polymer is preferably selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures.

In addition, in the optical fiber unit according to the present invention, the plasticized polyvinylchloride is preferably plasticized by a plasticizer selected from the group consisting of phthalate plasticizer, aliphatic dibasic acid ester plasticizer, and their mixture.

The buffer tube may be made of a mixture that includes 100 parts by weight of polyvinylchloride; 50 to 150 parts by weight of plasticizer; 2 to 30 parts by weight of any polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures; and 50 to 250 parts by weight of inorganic additive. Or else, the buffer tube may be made of a mixture that includes 100 parts by weight of polyvinylchloride; 50 to 150 parts by weight of plasticizer; 3 to 30 parts by weight of nitrile rubber; and 50 to 250 parts by weight of inorganic additive. More preferably, the buffer tube may be made of a mixture that includes 100 parts by weight of polyvinylchloride; 50 to 150 parts by weight of plasticizer; 2 to 30 parts by weight of any polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures; 3 to 30 parts by weight of nitrile rubber; and 50 to 250 parts by weight of inorganic additive.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
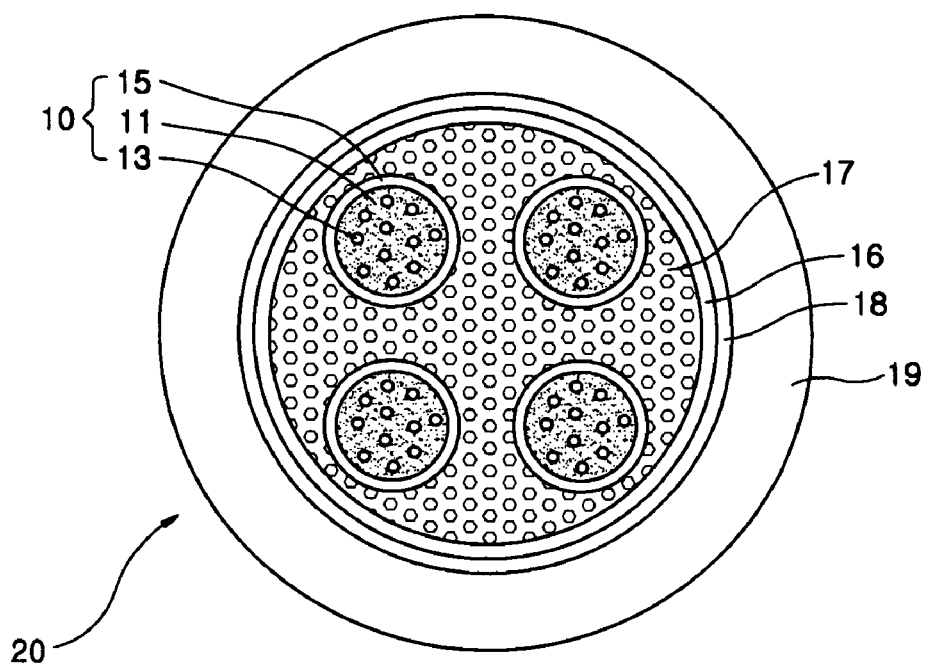
FIG. 1 is a sectional view showing a general optical cable including optical fiber units.

Hereinafter, the present invention will be described in more detail referring to the drawings.

An optical fiber unit according to the present invention is configured so that at least 1-core optical fiber is mounted in and protected by a buffer tube. The buffer tube is made of a mixture in which an inorganic additive is added to a composite resin including a resin having polyolefin polymer and nitrile rubber in single or in mixture, and plasticized polyvinylchloride. Here, the buffer tube is used by controlling a modulus and a tan δ to be in predetermined ranges, that is to say, so that, in a stress-strain curve of the buffer tube, a modulus is 5 to 50 kgf/mm$^2$ in a linear region with an elongation less than 1% and a tan δ is less than 0.5 at 30° C. Such a buffer tube may be easily cut out and not easily crushed by lateral pressure, and it is well restored to its original shape.

In the optical fiber unit according to the present invention, the polyolefin polymer in the composite resin, which constitutes the buffer tube, may use denatured polyethylene such as chlorinated polyethylene, ethylene vinyl acetate copolymer with 40 to 80 wt % of vinyl acetate, and ethylene vinyl acetate carbon monoxide terpolymer with 40 to 80 wt % of vinyl acetate, in single or in mixture.

In the optical fiber unit according to the present invention, the plasticized polyvinylchloride in the composite resin for forming the buffer tube is made by mixing plasticizer to commonly used polyvinylchloride and then endowing flexibility thereto, and it is preferably plasticized by adding phthalate plasticizer and/or aliphatic dibasic acid ester plasticizer in order to improve thermal stability and minimize volatility. The plasticizer may be di-n-octyl phthalate, diundecyl phthalate, diisodecyl adipate, di-2-ethylhexyl adipate, di-2-ethylhexyl azelate, di-2-ethylhexyl sebacate, diisodecyl phthalate, tri-2-ethylhexyl trimellitate, and the like.

In addition, in the optical fiber unit of the present invention, the inorganic additive may use not only calcium carbonate, talc and silica but also metal hydroxide with flame retardancy such as aluminum hydroxide and magnesium hydroxide. The inorganic additive may be surface-treated with fatty acid or polymer resin as necessary. This inorganic additive helps the buffer tube to be easily shed and gives resistance against lateral pressure.

The buffer tube as mentioned above may be made of the following mixture.

That is to say, the mixture may include 100 parts by weight of polyvinylchloride; 50 to 150 parts by weight of plasticizer; 2 to 30 parts by weight of any polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures; and 50 to 250 parts by weight of inorganic additive. If the content of plasticizer is less than 50 parts by weight, plasticizing effect and elongation are decreased and viscosity is increased, thereby deteriorating extruding property. If the content of plasticizer is more than 150 parts by weight, 1% modulus may be too lowered. In addition, if the content of the polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures is less than 2 parts by weight, the elasticity may be deteriorated, and if exceeding 30 parts by weight, the influence affected on the elasticity becomes insignificant. In addition, if the content of the inorganic additive is less than 50 parts by weight, the tube becomes so flexible to give an influence on the 1% modulus, and if exceeding 250 parts by weight, the tube may become too hard.

In the above components, 3 to 30 parts by weight of nitrile rubber may be further added in place of or together with the aforementioned polyolefin polymer. That is to say, the buffer tube of the present invention may be made of a mixture that includes 100 parts by weight of polyvinylchloride; 50 to 150 parts by weight of plasticizer; 3 to 30 parts by weight of nitrile rubber; and 50 to 250 parts by weight of inorganic additive. More preferably, the mixture includes 100 parts by weight of polyvinylchloride; 50 to 150 parts by weight of plasticizer; 2 to 30 parts by weight of any polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures; 3 to 30 parts by weight of nitrile rubber; and 50 to 250 parts by weight of inorganic additive.

In addition to them, various additives may be added to the mixture for making the buffer tube in the optical fiber unit of the present invention if they do not hinder the object of the present invention. For example, lead stabilizer and processing aids such as wax with low molecular weight, metal carboxylate, amide lubricant, carboxylic acid, metal stearate, and metal amide may be mixed in order to improve workability and productivity in the extruding process.

The above-described mixture is used for making the buffer tube, which composes an optical fiber unit together with optical fibers. A plurality of such optical fiber units may be applied to an optical cable as shown in FIG. 1.

Hereinafter, embodiments are described in detail for helping to understand the present invention. However, embodiments of the present invention may be variously modified, and the scope of the invention should not be interpreted to be limited to the following embodiments. The embodiments of the present invention are given only in a way of giving better explanation to those skilled in the art.

Embodiments 1 to 16 and Comparative Examples 1 to 4

Components stated in the following tables 1 to 3 were weighed and then mixed well to make a primary mixture.

After that, a surface temperature of 8 inch electric- or oil-heating roll mill was kept in the range of 130 to 140° C., and the mixture was put thereto so that the mixture was melt and combined. Subsequently, a pressure of 50 kgf/mm² was applied to the combined mixture at 170° C. for 5 minutes with the use of a heating press so that the mixture was shaped into a sheet that is then made into test pieces. In addition, an extruder was used to make a tube with an outer diameter of 1.4 mm and a thickness of 0.15 mm with the use of the combined mixture in order to evaluate its elasticity.

At this time, a content of vinyl acetate was 46 wt % in each of ethylene vinyl acetate copolymer and ethylene vinyl acetate carbon monoxide terpolymer.

EXPERIMENTAL EXAMPLES

Properties of the test pieces and the tubes made according to the embodiments and the comparative examples were measured as below, and shown in the following tables 4 to 6.

1% Modulus

1% modulus was calculated with measuring a tensile strength and an elongation at a tension speed of 500 mm/min for each test piece made in a shape of dumbbell with a thickness of 1 mm according to the embodiments and the comparative examples with the use of a tension tester in accordance with ASTM D638.

TABLE 1

| Components | Embodiments | | | | | | | |
|---|---|---|---|---|---|---|---|---|
| | 1 | 2 | 3 | 4 | 5 | 6 | 7 | 8 |
| Polyvinyl chloride | 100 | 100 | 100 | 100 | 100 | 100 | 100 | 100 |
| Diundecyl phthalate | 100 | — | — | — | — | 80 | — | — |
| Diisodecyl adipate | — | 120 | — | 150 | — | — | 100 | 100 |
| Tri-2-ethylhexyl trimellitate | — | — | 150 | — | 150 | — | — | — |
| Ethylene vinyl acetate copolymer | 12 | 12 | 12 | — | — | — | — | — |
| Chlorinated polyethylene | — | — | — | 20 | 20 | — | — | — |
| Ethylene vinyl acetate carbon monoxide terpolymer | — | — | — | — | — | 15 | 15 | — |
| Nitrile rubber | — | — | — | — | — | — | — | 12 |
| Calcium carbonate | 150 | — | 180 | 200 | — | 120 | 150 | 150 |
| Magnesium hydroxide | — | 150 | — | — | 200 | — | — | — |
| Lead stabilizer | 7 | 7 | 7 | 7 | 7 | 7 | 7 | 7 |
| Lubricant | 1.5 | 1.5 | 1.5 | 1.5 | 1.5 | 1.5 | 1.5 | 1.5 |

TABLE 2

| Components | Embodiments | | | | | | | |
|---|---|---|---|---|---|---|---|---|
| | 9 | 10 | 11 | 12 | 13 | 14 | 15 | 16 |
| Polyvinyl chloride | 100 | 100 | 100 | 100 | 100 | 100 | 100 | 100 |
| Diundecyl phthalate | — | 100 | — | — | — | — | 80 | — |
| Diisodecyl adipate | — | — | 120 | — | 150 | — | — | 100 |
| Tri-2-ethylhexyl trimellitate | 120 | — | — | 150 | — | 150 | — | — |
| Ethylene vinyl acetate copolymer | — | 10 | 10 | 10 | — | — | — | 10 |
| Chlorinated polyethylene | — | 15 | — | — | — | 15 | 10 | 10 |
| Ethylene vinyl acetate carbon monoxide terpolymer | — | — | 10 | — | 10 | — | 10 | — |
| Nitrile rubber | 12 | — | — | 5 | 5 | 5 | 5 | 5 |
| Calcium carbonate | 150 | 150 | — | 180 | 200 | — | 120 | 150 |
| Magnesium hydroxide | — | — | 150 | — | — | 200 | — | — |
| Lead stabilizer | 7 | 7 | 7 | 7 | 7 | 7 | 7 | 7 |
| Lubricant | 1.5 | 1.5 | 1.5 | 1.5 | 1.5 | 1.5 | 1.5 | 1.5 |

TABLE 3

| Components | Comparative Examples | | | |
|---|---|---|---|---|
| | 1 | 2 | 3 | 4 |
| Polyvinyl chloride | 100 | — | — | — |
| Polypropylene | — | 100 | — | — |
| Polybutylene terephthalate | — | — | 100 | — |
| Medium density polyethylene | — | — | — | 100 |
| Phthalate plasticizer | 60 | — | — | — |
| Calcium carbonate | 100 | — | — | — |
| Lead stabilizer | 7 | — | — | — |
| Lubricant | 0.5 | — | — | — |

Tan δ

Each test piece made into a circular shape (25 mm in diameter, 2 mm in thickness) according to the embodiments and the comparative examples was measured at 30° C. in a dynamic state with the use of a rotational rheometer (RDA, plate—plate). At this time, Tan δ was calculated as a ratio of loss modulus and storage modulus by conducting experiments under the conditions of 1.0 Hz, amplitude 1.0%.

Tear Strength

Tear strength was measured in accordance with ASTM D470 so as to evaluate easiness of cutting.

Elasticity 5 g weight having a plate shape was put on each tube made according to the embodiments 1 to 16 and the comparative examples 1 to 4 for 1 minute and then removed.

After that, a degree of restoring an original shape of the tube was quantitatively measured, and then its measurement results were classified into three classes (namely, S: completely restored into its original shape, A: restored into its original shape but a little crushed, F: not restored into its original shape).

TABLE 4

| | Embodiments | | | | | | | |
|---|---|---|---|---|---|---|---|---|
| Properties | 1 | 2 | 3 | 4 | 5 | 6 | 7 | 8 |
| 1% modulus | 19 | 25 | 21 | 29 | 32 | 33 | 16 | 18 |
| Tan δ | 0.25 | 0.29 | 0.32 | 0.28 | 0.34 | 0.38 | 0.26 | 0.22 |
| Tear strength (N/mm) | 3.3 | 2.8 | 2.4 | 2.3 | 2.1 | 3.4 | 3.1 | 2.9 |
| Elasticity | S | S | S | S | S | S | S | S |

TABLE 5

| | Embodiments | | | | | | | |
|---|---|---|---|---|---|---|---|---|
| Properties | 9 | 10 | 11 | 12 | 13 | 14 | 15 | 16 |
| 1% modulus | 20 | 30 | 28 | 23 | 19 | 34 | 25 | 20 |
| Tan δ | 0.35 | 0.27 | 0.33 | 0.31 | 0.25 | 0.35 | 0.23 | 0.21 |
| Tear strength (N/mm) | 2.7 | 3.8 | 2.7 | 3.1 | 2.4 | 2.5 | 3.9 | 3.2 |
| Elasticity | S | S | S | S | S | S | S | S |

TABLE 6

| | Comparative Examples | | | |
|---|---|---|---|---|
| Properties | 1 | 2 | 3 | 4 |
| 1% modulus | 52 | 80 | 120 | 60 |
| Tan δ | 0.54 | 0.71 | 0.83 | 0.62 |
| Tear strength (N/mm) | 6.5 | 10.7 | 15.4 | 9.8 |
| Elasticity | A | F | F | F |

Seeing Tables 4 to 6, it may be understood that the test pieces according to the embodiments of the present invention, which have 1% modulus of 5 to 50 kgf/mm$^2$ and Tan δ of 0.5 or less at 30° C., have resistance against the pressing by lateral pressure and are easily restored into their original shapes after the pressing is exerted, as well as are easily cut out. However, it is also revealed that the test pieces according to the comparative examples, which have 1% modulus of more than 50 kgf/mm$^2$ and Tan δ of more than 0.5 at 30° C., have bad elasticity and are not easily cut out.

APPLICABILITY TO THE INDUSTRY

As described above, the buffer tube of the optical fiber unit according to the present invention may be very usefully applied to an optical cable because it may be easily cut out to ensure easy contact and gives excellent elasticity without being crushed by lateral pressure.

What is claimed is:

1. An optical fiber unit in which at least 1-core optical fiber is mounted in and protected by a buffer tube, wherein the buffer tube is made of a mixture comprising:
    a composite resin including a resin selected from the group consisting of polyolefin polymer, nitrile rubber, and their mixture, and plasticized polyvinylchloride; and
    an inorganic additive,
    wherein, in a stress-strain curve of the buffer tube, a modulus is 5 to 50 kgf/mm$^2$ in a linear region with an elongation less than 1% and a tan δ is less than 0.5 at 30° C.

2. The optical fiber unit according to claim 1,
    wherein the polyolefin polymer is selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures.

3. The optical fiber unit according to claim 1,
    wherein the plasticized polyvinylchloride is plasticized by a plasticizer selected from the group consisting of phthalate plasticizer, aliphatic dibasic acid ester plasticizer, and their mixture.

4. The optical fiber unit according to claim 1,
    wherein the mixture includes 100 parts by weight of polyvinylchloride; 50 to 150 parts by weight of plasticizer; 2 to 30 parts by weight of any polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures; and 50 to 250 parts by weight of inorganic additive.

5. The optical fiber unit according to claim 1,
    wherein the mixture includes 100 parts by weight of polyvinylchloride; 50 to 150 parts by weight of plasticizer; 3 to 30 parts by weight of nitrile rubber; and 50 to 250 parts by weight of inorganic additive.

6. The optical fiber unit according to claim 1,
    wherein the mixture includes 100 parts by weight of polyvinylchloride; 50 to 150 parts by weight of plasticizer; 2 to 30 parts by weight of any polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures; 3 to 30 parts by weight of nitrile rubber; and 50 to 250 parts by weight of inorganic additive.

7. The optical fiber unit according to claim 1,
    wherein the inorganic additive is one selected from the group consisting of calcium carbonate, talc, silica, aluminum hydroxide, magnesium hydroxide, and their mixtures.

8. An optical cable including a plurality of optical fiber units in which at least 1-core optical fiber is mounted in and protected by a buffer tube, wherein the buffer tube is made of a mixture comprising:
    a composite resin including a resin selected from the group consisting of polyolefin polymer, nitrile rubber, and their mixture, and plasticized polyvinylchloride; and
    an inorganic additive,
    wherein, in a stress-strain curve of the buffer tube, a modulus is 5 to 50 kgf/mm$^2$ in a linear region with an elongation less than 1% and a tan δ is less than 0.5 at 30° C.

9. The optical cable according to claim 8,
    wherein the polyolefin polymer is selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures.

10. The optical cable according to claim 8,
wherein the plasticized polyvinylchloride is plasticized by a plasticizer selected from the group consisting of phthalate plasticizer, aliphatic dibasic acid ester plasticizer, and their mixture.

11. The optical cable according to claim 8,
wherein the mixture includes 100 parts by weight of polyvinylchloride; 50 to 150 parts by weight of plasticizer; 2 to 30 parts by weight of any polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures; and 50 to 250 parts by weight of inorganic additive.

12. The optical cable according to claim 8,
wherein the mixture includes 100 parts by weight of polyvinylchloride; 50 to 150 parts by weight of plasticizer; 3 to 30 parts by weight of nitrile rubber; and 50 to 250 parts by weight of inorganic additive.

13. The optical cable according to claim 8,
wherein the mixture includes 100 parts by weight of polyvinylchloride; 50 to 150 parts by weight of plasticizer; 2 to 30 parts by weight of any polymer selected from the group consisting of chlorinated polyethylene, ethylene vinyl acetate copolymer with 40 to 80 wt % of vinyl acetate, ethylene vinyl acetate carbon monoxide terpolymer with 40 to 80 wt % of vinyl acetate, and their mixtures; 3 to 30 parts by weight of nitrile rubber; and 50 to 250 parts by weight of inorganic additive.

14. The optical cable according to claim 8,
wherein the inorganic additive is one selected from the group consisting of calcium carbonate, talc, silica, aluminum hydroxide, magnesium hydroxide, and their mixtures.

* * * * *